Figure 1:
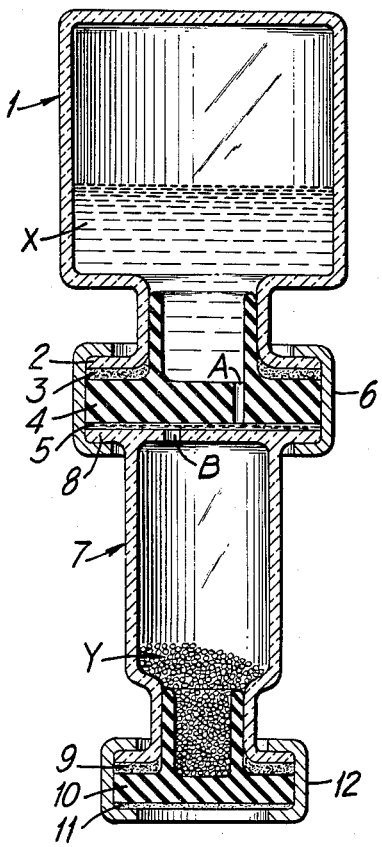

March 8, 1966  P. D. MOYLAN  3,239,089
VIALS
Filed Oct. 30, 1964

INVENTOR.
PATRICK DONOUGH MOYLAN
BY

ATTORNEYS.

United States Patent Office 3,239,089
Patented Mar. 8, 1966

3,239,089
VIALS
Patrick Donough Moylan, 3 Bindon St., Ennis, Ireland
Filed Oct. 30, 1964, Ser. No. 407,756
Claims priority, application Ireland, Nov. 6, 1963,
1,081/63
5 Claims. (Cl. 215—6)

This invention relates to containers, and more particularly to vials for storing separately two or more substances the mixing of which is required just prior to use and for mixing the same just prior to use, and is of utility especially for preparing solutions for medicinal injections or industrially for storing separately a liquid and solid, two liquids, a liquid and a gas, or two gases the mixing of which is required just prior to use.

It is among the objects of this invention to provide a new and improved vial suitable for preparing solutions for medicinal injections or industrially storing separately a liquid and solid, two liquids, a liquid and a gas, or two gases the mixing of which is required just prior to use.

It is another object of this invention to reduce the amount of time and work involved in the preparation of the solution in that form of medicinal injection where a solvent in one vial is added to a solute in another vial, the resultant solution being then injected.

Other and further objects and advantages of this invention will be set forth in part hereinafter and in part will be obvious herefrom, or may be learned by practice of the invention, the same being realized and attained by means of the instrumentalities, combinations and steps pointed out in the appended claims.

The invention consists in the novel parts, construction arrangements, combinations, instrumentalities, steps, and improvements herein shown and/or described.

According to the invention the preparation of the solution is reduced to a movement of rotation by the use of a double chamber vial (each chamber conforming in a modified way more or less to the general pattern of an ordinary medicinal vial i.e. a circular glass bottle with a flat base and a circular neck opening stoppered by a rubber cap). The rubber cap of one chamber containing the solvent under increased atmospheric pressure is applied by sufficient pressure to a glass base of the other chamber containing the solute at sub-atmospheric pressure so that when assembled and not in use each chamber, though joined, is hermetically sealed and separate from the other. However, when required for use and it is desirous to have the two chambers communicate this can be effected by bringing an eccentric hole in the rubber cap of the solvent chamber into apposition with an eccentric hole in the glass base of the solute chamber, these said holes hitherto not being in apposition, by a process of rotation of the two chambers of the vial on one another.

To ensure that when the two chambers are rotated on one another the glass base of the solute chamber rotates on the rubber cap of the solvent chamber, it is essential that the rubber cap of the solvent chamber be firmly fixed to the flange on the opening of its own chamber by, for instance, a suitable glass rubber glue. Though the vial can be made of any rigid substance with a perfectly regular flat base such as a rigid plastic or glass, it is essential that the cap be made of rubber or of a substitute with similar retractile properties to rubber. For medicinal purposes glass is usually used so the junction of the two chambers is a glass-rubber junction.

Though devised and described so far for adding a solvent to a solute, such as water to penicillin, to form a solution for medicinal injection the vial is equally applicable in industrial fields where a liquid and solid, two liquids, a liquid and a gas or two gases which are stored separately but mixed before use are concerned.

The vial may be assembled as follows say, for instance, to contain the ingredients for an injection of a million units of penicillin. The construction will be described with reference to the accompanying drawings which constitute a part hereof and serve to illustrate one embodiment of the invention and, together with the description, serve to explain the principles of the invention.

Figure 4:
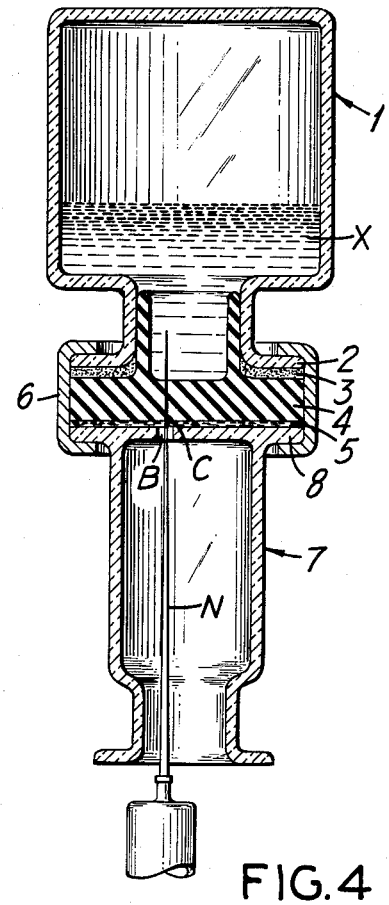
Figure 2:
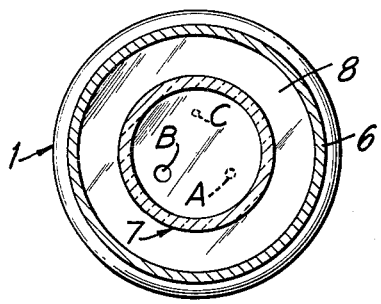
Figure 3:
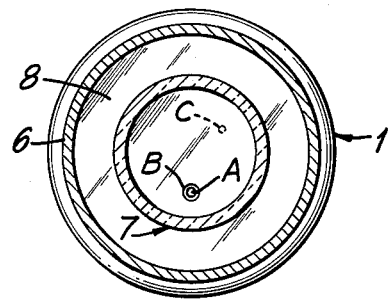

Of the drawings:
FIGURE 1 is a view in vertical section through the dual chamber vial with its two chambers hermetically sealed and separate from each other;
FIGURE 2 is a view in horizontal section taken along the plane of the inner surface of the base of the lower or solute chamber of the vial of FIG. 1 and with the chambers in the same relative angular position they occupy in FIG. 1;
FIGURE 3 is a view corresponding to that of FIG. 2 but with the chambers displaced angularly from the position shown in FIG. 2 so that the two chambers are in communication; and
FIGURE 4 is a view in vertical section through the dual chamber vial of FIGURE 1, the view showing the solvent chamber in the process of being pressurized by the introduction of a pressurizing medium.

Referring now more particularly to the accompanying drawings, to, say a 7 cc. solvent chamber 1 with a projecting flange 2 around its neck opening is added 2 cc. of water $x$. The flange is rubbed with a suitable non-toxic durable glass-rubber glue 3.

A rubber cap 4 with a small eccentric hole A at, say, 4 o'clock (see FIG. 2), is applied to the opening and flange of solvent chamber 1. The rubber must be of such thickness and quality that when punctured by a thin needle it seals itself off against moderately increased pressure. The top of the rubber cap is covered with a thin film of a non-toxic oil 5.

The base of the solute chamber 7 is provided with a special projecting flange 8 on the outside of the, say 7 cc., solute chamber, the base having an eccentric hole B, which must be large enough to permit entry of a thin needle. The base is applied by pressure sufficient to seal to the rubber cap 4 of the solvent chamber 1 so that the base eccentric hole B is at 12 o'clock and does not coincide with the hole A in the rubber cap.

The firm apposition of the adjacent neck, cap and base is then assured and maintained by a circular outer ring of foil 6, as in fixing the rubber cap of an ordinary vial. This prevents the separation of rubber cap 4 and the base of the solute chamber 7, but will permit their rotation on one another.

Through the neck of the empty solute chamber 7, which neck can be placed in line with the hole B in the solute chamber base, a thin hypodermic needle N is inserted right through the hole B in the base of the solute chamber 7 and then through the rubber cap 4 of the solvent chamber, and an amount of air at least as great as the amount of solvent, say 2–3 cc., is injected by the needle N into the solvent chamber 1. The needle is then quickly withdrawn.

To further ensure the sealing of the solvent chamber 1, the chambers 1 and 7 are then further rotated on one another so that the final position is: the hole B in the base of the solute chamber 7 at 8 o'clock, the needle puncture C in the rubber cap 4 at 12 o'clock, and the hole A in the rubber cap 4 at 4 o'clock, all as depicted in FIG. 2.

The solute (i.e. penicillin powder) Y is then added to the solute chamber 7, a complete rubber cap 10 is applied to the opening in the neck of the solute chamber and sealed around the edge with a suitable non-toxic durable glass-rubber glue 9 and a circular outer ring of foil 12 as was done in connection with the solvent chamber 1.

A thin needle, such as the needle N is then inserted through and perforates the rubber cap 10 and withdraws enough air, say 4 cc., from the solute chamber 7 to create a partial vacuum therein sufficient to accommodate the solvent. The needle is then quickly withdrawn and suitable rubber will seal itself.

To act as a further seal the rubber cap 10 can be coated with a suitable sealing solution 11.

The dual chamber vial is now assembled.

The increased pressure in the solvent chamber can be produced in different ways, one of which has been described above.

Alternative methods are:

(1) When the two chambers 1 and 7 are being connected the side of the solute chamber base away from its eccentric hole B is made to partly overlap the rubber cap 4 so as to firmly occlude the hole A in the latter. The sterile air injection is then made into the exposed part of the rubber cap 4. The solute chamber 7 is then rotated into position, still under pressure, and fixed.

(2) Having a second rubber cap (not shown) in an opening in the base of the solvent chamber 1 through which the air is injected by means of the thin needle after the two chambers have been joined together. This second rubber cap is then sealed on the outside as for the solute chamber cap.

(3) Or the two chambers can be assembled empty at atmospheric pressure and the solvent then injected into the sealed solvent chamber.

In order to effect mixing of the contents of the pressurized chamber 1 and the reduced-pressure chamber 7, the chambers may be rotated relative to each other so as to place the hole B in the base of the solute chamber in apposition to the hole A in the cap 4 of the solvent chamber, thus placing the chambers in communication with each other (see FIG. 3). The pressure differential between the two chambers will cause solvent in the overlying chamber 1 to flow through the aligned openings A and B into the solute chamber 1 and mixing can be effected by suitable agitation.

It will be understood that changes may be made from the exact structures shown and described without departing from the principles of the invention and without sacrificing its chief advantages.

What is claimed is:

1. A double chambered vial suitable for preparing solutions for medicinal injections or industrially for storing separately a liquid and solid, two liquids, a liquid and a gas, or two gases the mixing of which is required just prior to use, in which each chamber is comprised of a bottle-shaped flat-bottomed container made of rigid material, with the circular opening of its neck stoppered by a cap formed of a substance with similar retractile properties to rubber and with its flat bottom providing a base, the base of one container and the cap of the other being formed each with an eccentrically positioned hole, and in which the two containers are mounted co-axially and held together for relative axial rotation, by pressure of a clamping band, with the base and cap formed with a hole, abutting, the construction and arrangement being such that the said holes are out of alignment when the vial is assembled but can be brought into apposition by the rotation of one chamber relative to the other.

2. A vial according to claim 1, in which the container provided with a hole in its base has an integral peripheral base flange which is engaged by said clamping band used for joining the chambers, by pressure sufficient to hermetically seal each chamber and yet allow rotation of one on the other.

3. A vial according to claim 1 in which a thin film of a non-toxic oil is applied to the top of the cap which abuts the base of one of the chambers.

4. A vial according to claim 1 in which each container is made of glass and in which the cap of each container is made of rubber and is fixed to the neck of its own chamber by means of a suitable adhesive.

5. A vial according to claim 1 in which the base of the container having its opening stoppered with the cap formed with a hole is constituted by a rubber element secured to the wall of that container.

No references cited.

JOSEPH R. LECLAIR, *Primary Examiner.*

FRANKLIN T. GARRETT, *Examiner.*